US012654877B2

(12) United States Patent
Gillessen et al.

(10) Patent No.: US 12,654,877 B2
(45) Date of Patent: Jun. 16, 2026

(54) PROCESS FOR PRODUCING A COMPONENT HAVING A THERMOPLASTIC FIBER COMPOSITE AND COMPONENTS MADE BY THE PROCESS

(71) Applicant: Airbus Operations GmbH, Hamburg (DE)

(72) Inventors: Alexander Gillessen, Hamburg (DE); Paul Jörn, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 406 days.

(21) Appl. No.: 17/582,068

(22) Filed: Jan. 24, 2022

(65) Prior Publication Data

US 2022/0204182 A1     Jun. 30, 2022

Related U.S. Application Data

(63) Continuation of application No. PCT/EP2020/069938, filed on Jul. 15, 2020.

(30) Foreign Application Priority Data

Jul. 29, 2019     (DE) .................... 10 2019 120 378.3

(51) Int. Cl.
*B64F 5/10*          (2017.01)
*B29C 70/00*      (2006.01)
(Continued)

(52) U.S. Cl.
CPC .............. *B64F 5/10* (2017.01); *B29C 70/003* (2021.05); *B29C 70/20* (2013.01); *B29C 70/386* (2013.01);
(Continued)

(58) Field of Classification Search
CPC . B64F 5/10; B29C 70/50; B29C 70/38; B29C 70/20; B29C 70/00; B29C 70/504;
(Continued)

(56) References Cited

U.S. PATENT DOCUMENTS

| 10,293,559 B2 * | 5/2019 | Fernandes ............. B29C 70/446 |
| 2007/0175571 A1 | 8/2007 | Rubin |

(Continued)

FOREIGN PATENT DOCUMENTS

| DE | 101 14 554 A1 | 9/2002 |
| DE | 10 2008 041 832 A1 | 3/2010 |

(Continued)

OTHER PUBLICATIONS

European Office Action for U.S. Appl. No. 20/742,223 dated Jul. 26, 2023.

(Continued)

*Primary Examiner* — Alison L Hindenlang
*Assistant Examiner* — Shibin Liang
(74) *Attorney, Agent, or Firm* — KDW Firm PLLC

(57)          ABSTRACT

A process for producing a component for an aircraft for the frame, e.g. formers and stringers. Aircraft are being increasingly constructed of polymeric fiber composite to reduce weight. Here, fiber composites were originally composed of thermoset polymer and carbon fibers. Thermoplastic fiber composites are increasingly a research focus. An example is poly(ether ether ketone). However, production of components of thermoplastic fiber composites is complex. An improved process for producing such components includes producing a sheet-like object with a thermoplastic fiber composite having a thermoplastic polymer material and reinforcing fibers embedded therein, forming the sheet-like object for a semifinished part, and solidification of the (Continued)

semifinished part to give the component. Components obtainable by this process are also disclosed.

13 Claims, 4 Drawing Sheets

(51) Int. Cl.

| | |
|---|---|
| *B29C 70/20* | (2006.01) |
| *B29C 70/38* | (2006.01) |
| *B29C 70/50* | (2006.01) |
| *B29K 71/00* | (2006.01) |
| *B29K 105/10* | (2006.01) |
| *B29K 307/04* | (2006.01) |
| *B29L 31/30* | (2006.01) |

(52) U.S. Cl.
CPC ........ *B29C 70/504* (2013.01); *B29K 2071/00* (2013.01); *B29K 2105/106* (2013.01); *B29K 2307/04* (2013.01); *B29L 2031/3082* (2013.01)

(58) Field of Classification Search
CPC ... B29C 70/003; B29C 70/396; B29C 70/386; B29L 2031/3082
See application file for complete search history.

(56) References Cited

U.S. PATENT DOCUMENTS

| | | | |
|---|---|---|---|
| 2007/0175575 A1* | 8/2007 | Rubin | .................... B29C 65/02 |
| | | | 156/196 |
| 2014/0183784 A1 | 7/2014 | Bartel et al. | |
| 2016/0101543 A1 | 4/2016 | Fisher, Jr. et al. | |
| 2018/0229452 A1* | 8/2018 | Ogale | .................... B32B 37/16 |
| 2018/0319102 A1* | 11/2018 | Kurtz | .................... B29C 70/462 |

FOREIGN PATENT DOCUMENTS

| | | |
|---|---|---|
| DE | 10 2011 056 686 A1 | 6/2013 |
| DE | 10 2012 101 016 A1 | 8/2013 |
| DE | 10 2013 226 739 A1 | 6/2015 |
| DE | 10 2013 226 753 A1 | 6/2015 |
| EP | 2 815 874 A1 | 12/2014 |

OTHER PUBLICATIONS

German Search Report for Application No. 102019120378 dated Feb. 5, 2020.
International Search Report for Application No. PCT/EP2020/069938 dated Sep. 28, 2020.

* cited by examiner

30

32

PROCESS FOR PRODUCING A COMPONENT HAVING A THERMOPLASTIC FIBER COMPOSITE AND COMPONENTS MADE BY THE PROCESS

CROSS-REFERENCE TO RELATED APPLICATIONS

This application is a continuation of and claims priority to PCT Application No. PCT/EP2020/069938 filed Jul. 15, 2020 which claims priority to German Patent Application No. 10 2019 120 378.3 filed Jul. 29, 2019, the entire disclosures of which are incorporated by reference herein.

TECHNICAL FIELD

The disclosure herein relates to a process for producing a component composed of thermoplastic fiber composite for an aircraft. The disclosure herein further relates to the components obtainable by this process and an aircraft comprising at least one such component.

The components are, in particular, components for the aircraft fuselage, for example formers and stringers.

BACKGROUND

In the construction of aircraft, the saving of weight is an important aspect because of the associated saving of fuel. A great potential for weight reduction is offered by replacement of metallic components by components composed of polymeric fiber composite.

The fiber composites which can be used for this purpose were originally essentially fiber composites comprising a thermoset polymer as matrix material and carbon fibers embedded therein. Precursors of thermoset fiber composites are processed in an orienting AFP ("automated fiber placement") process to give laminates. They can be heated for the placement operation. Strips of the precursor material can be laid directly by a placement robot onto a tool to give the desired component shape. The component is subsequently consolidated at about 180° C. with curing of the matrix material.

With the development of modern thermoplastic polymers, for example high performance plastics which have a high melting point and very good mechanical properties which are retained up to high temperatures, thermoplastic fiber composites have increasingly moved into the focus of research and development. Examples of such high performance plastics are polyaryl ether ketones, e.g. poly(ether ether ketone) (PEEK), polysulfones, polysulfides and polyimides.

However, the production of components composed of thermoplastic fiber composites which comprise such a high performance plastic as matrix and carbon fibers as reinforcing fibers is a complex operation.

In the case of fiber composites comprising a thermoplastic matrix material, different processes than those in the case of thermoset fiber composites are required since the processing temperatures are higher and consolidation of the composite is effected essentially by cooling and not by curing.

In addition, the carbon fibers are present anisotropically in fiber composites. When the fibers are correctly oriented along the main mechanical loading direction of a component, they ensure the desired mechanical strength of a component while at the same time providing a weight saving. In the case of thermoplastic polymers having a high melting point however, the mobility of the carbon fibers in the polymer is less than in the sparingly crosslinked precursors of thermoset matrix materials. It can therefore be difficult to achieve particular fiber orientations.

SUMMARY

It is an object of the disclosure herein to provide an improved process for producing components composed of thermoplastic fiber composite for aircraft.

The object is achieved by the subject matter disclosed herein. Advantageous further developments are disclosed herein.

The disclosure herein provides a process for producing a component composed of thermoplastic fiber composite for an aircraft, which comprises the following steps:

a) production of a sheet-like object composed of a thermoplastic fiber composite which comprises a thermoplastic polymer material and reinforcing fibers embedded therein, b) forming of the sheet-like object to give a semifinished part and c) solidification of the semifinished part to give the component.

Preference is given to the thermoplastic polymer material being selected from among one or more of polyamides, in particular aromatic polyamides such as poly-m-phenyleneisophthalamide, polyesters, in particular aromatic polyesters, polyaryls, in particular polyphenylene sulphides, polyether sulfones and polyaryl ether ketones, heterocyclic polymers such as polyimides, polybenzimidazoles and polyether imides, and mixtures produced therefrom.

Preference is given to the reinforcing fibers consisting of carbon fibers or comprising carbon fibers.

Preference is given to the polyaryl ether ketone being selected from among one or more of poly(ether ether ketone), poly(ether ketone ketone), poly(ether ether ether ketone), poly(ether ether ketone ketone) and poly(ether ketone-ether ketone ketone).

Step a) preferably comprises production of the sheet-like object from a starting material which is selected from among sheets, bands, tows, patches, strips and/or tapes composed of thermoplastic fiber composite.

Step a) preferably comprises production of the sheet-like object from a starting material which is heated to a temperature at which the plasticity of the thermoplastic polymer material allows the formation of the sheet-like object.

Step a) preferably comprises production of the sheet-like object by placement of a starting material on a surface of a placement apparatus, in particular using a placement robot.

Step a) preferably comprises production of the sheet-like object by placement of a starting material to form a laminate.

Step a) preferably comprises production of the sheet-like object by placement of a starting material according to a predetermined three-dimensional placement pattern which prescribes the orientation of the reinforcing fibers and/or the position-dependent thickness of the sheet-like object.

Step a) preferably comprises production of the sheet-like object by placement of a starting material in such a way that all or part of the reinforcing fibers form 0° reinforcing fibers in the finished component, based on one or more main axes, main edges, longitudinal axes, longitudinal edges of the component.

Step a) preferably comprises production of the sheet-like object in a static process.

Step a) preferably comprises production of the sheet-like object by "automated fiber placement" and/or "automated tape laying".

Step b) preferably comprises forming of the sheet-like object in a continuous forming process, in particular continuous high-speed forming process.

Step b) preferably comprises forming of the sheet-like object under pressure conditions and/or temperature conditions under which the thermoplastic polymer material or the thermoplastic fiber composite has a plasticity suitable for the forming process. The temperature conditions depend, in particular, on the glass transition temperature and the melting point and the physical properties of the thermoplastic polymers in the various temperature ranges.

Step b) preferably comprises forming of the sheet-like object in a continuous profiling process.

Step b) preferably comprises forming of the sheet-like object in a roll forming process.

Step b) preferably comprises forming of the sheet-like object in a continuous pressure molding process, e.g. a simplified "continuous compression molding" process.

Step b) preferably comprises forming of the sheet-like object in a 3D preforming process.

Step b) preferably comprises forming of the sheet-like object with alteration of its cross section and/or its curvature.

Step b) preferably comprises forming of the sheet-like object with sliding of the reinforcing fibers into the desired fiber orientation position, in particular with setting of a required local orientation of the reinforcing fibers.

Step b) preferably comprises forming of the sheet-like object in such a way that all or part of the reinforcing fibers form 0° reinforcing fibers in the finished component, based on one or more main axes, main edges, longitudinal axes and/or longitudinal edges of the component. This makes it possible, for example, to produce flanges and webs and bases of a stiffening part, e.g. a stringer or a former, with 0° orientation of the reinforcing fibers.

Step b) preferably comprises forming of the sheet-like object with partial solidification and/or consolidation of the thermoplastic fiber composite, in particular with retention of a minimum degree of formability of the thermoplastic fiber composite which is necessary for step c).

Step b) preferably comprises forming of the sheet-like object in a static process, in particular by pressing the semifinished product in a one-sided or two-sided molding tool.

Step c) preferably comprises solidification of the semifinished part in a static process.

Step c) preferably comprises solidification of the semifinished part by application of pressure, in particular with simultaneous heating of the semifinished part.

Step c) preferably comprises solidification of the semifinished part by pressing in a heatable press in a static pressing process, in particular with simultaneous heating of the semifinished part.

Step c) preferably comprises solidification of the semifinished part with retention of the shape of the semifinished part obtained in step b) or with further forming of the semifinished part.

Step c) preferably comprises solidification of the semifinished part in a pressing process in a pressing apparatus using a one-sided or two-sided stiff pressing tool.

Step c) preferably comprises solidification of the semifinished part in a pressing process using a one-sided or two-sided stiff pressing tool having a tool insert which has been inserted into the pressing tool and serves for additionally altering the contour of the semifinished part.

Step c) preferably comprises solidification of the semifinished part in a process which is a combination of pressing and embossing, pressing and forming or forming and embossing.

The process makes it possible to produce components such as formers and stringers for integral frames having specific shapes, which are required, for example, for frame bases on an outer skin with joggles.

Step c) preferably comprises solidification of the semifinished part at a temperature in the range from 300° C. to 400° C., in particular with application of pressure.

The semifinished part produced in step b) is preferably cut to size, in particular for shortening the semifinished part in the longitudinal direction and/or for altering the contour of the semifinished part, before it is passed to step c).

Preference is given to steps a) to c) being carried out continuously in a production line.

The heated semifinished part obtained in step b) is preferably processed further in step c) without intermediate cooling.

Preference is given to the component being a component for the fuselage of an aircraft and comprising, in particular, fuselage stiffening parts, frame parts, frame-like parts, formers and stringers.

The disclosure herein further provides an apparatus for carrying out the above-described process, which comprises the following components:

i) an apparatus for the production of a sheet-like object composed of a thermoplastic fiber composite which comprises a thermoplastic polymer material and reinforcing fibers embedded therein;

ii) an apparatus for forming of the sheet-like object to give a semifinished part;

iii) an apparatus for solidification of the semifinished part under pressure.

Preference is given to one or more of the apparatuses i) to iii) being heatable.

Preference is given to the apparatuses of i), ii) and iii) being part of a continuous production line.

The disclosure herein further provides a component for an aircraft, which component is obtainable by one of the processes described above or using the apparatus described above.

Finally, the disclosure herein provides an aircraft which comprises at least one component as described above.

BRIEF DESCRIPTION OF THE DRAWINGS

A working example will be described in more detail below with the aid of the accompanying drawings. The drawings show.

DETAILED DESCRIPTION

Figure 1:
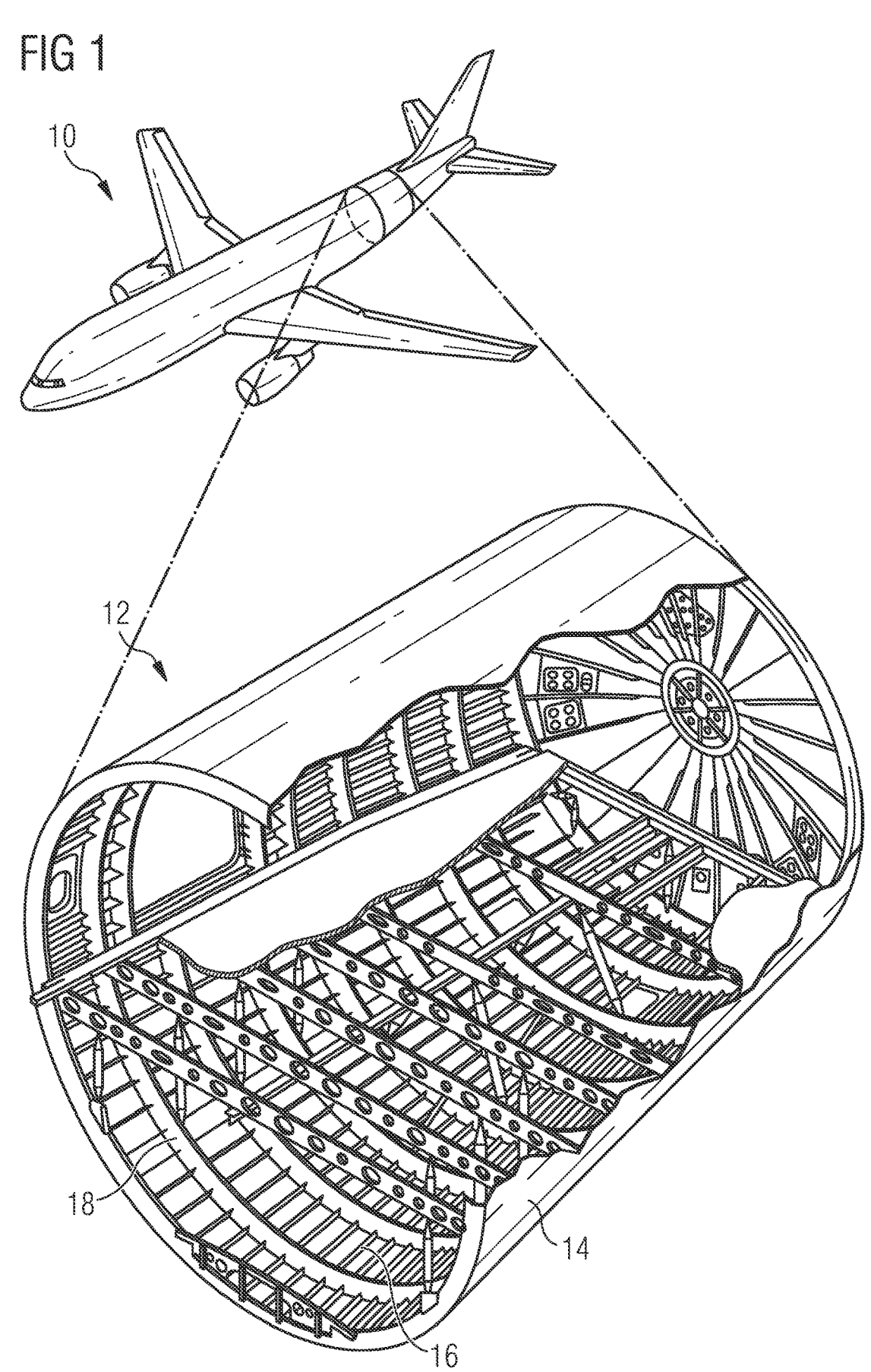
FIG. 1 an aircraft and an enlargement of a fuselage section of the aircraft fuselage.

FIG. 1 shows an aircraft 10 and an enlargement of a rear fuselage section 12 of the aircraft 10. The fuselage section 12 comprises an outer skin 14, stringers 16 running in the longitudinal direction and formers 18 running in the circumferential direction. Stringers 16 and formers 18 form stiffening components for stiffening the outer skin 14. These parts of the fuselage and other fuselage components, but also more generally all other components of an aircraft, e.g. clips or frames, can be produced by the process of the disclosure herein.

To carry out the process of the disclosure herein, strips 20 composed of polyether ether ketone with carbon fibers unidirectionally arranged therein are firstly produced from a thermoplastic polymer material, e.g. a polyaryl ether ketone, for example polyether ether ketone, and carbon fibers.

Figure 2:
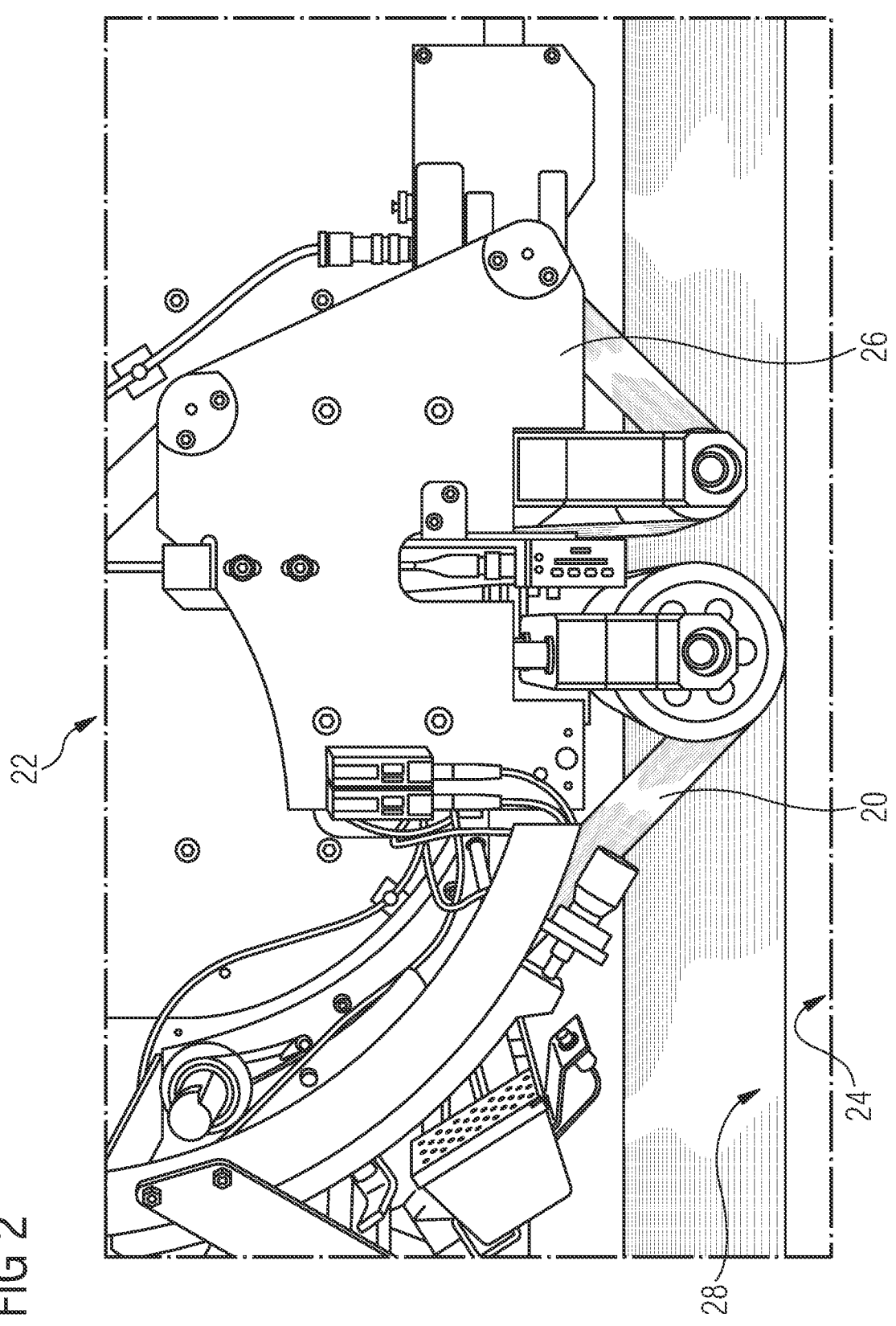
FIG. 2 a photograph and illustration of a plant for automatic placement of thermoplastic fiber composite in an "automated fiber placement" process (step a))

The strips 20 composed of thermoplastic composite are rolled up on reels of a placement apparatus 22. FIG. 2 shows a photograph of such a placement apparatus 22 which is suitable for carrying out the first step a) of the process of the disclosure herein. The apparatus depicted is an apparatus from the company Airborne and is used for carrying out the pick&place process.

The strips 20 are placed on a surface 24 of the placement apparatus 22 by an automatic placement head 26 according to a predetermined placement pattern. Placement here is carried out, for example at a temperature which is sufficiently high for the polyether ether ketone to soften and the strips 20 to join on the surface of the placement apparatus 22 to give a sufficiently cohesive but not consolidated sheet-like object 28.

The sheet-like object 28 preferably already acquires the contour corresponding to the outline of a component 16, 18, here for example a former 18, on placement of the strips 20 of thermoplastic fiber composite. In this way, a cutting-to-size of the laid-down sheet-like object 28 and thus loss of material can be avoided. In addition, the strips 20 of thermoplastic fiber composite are predominantly laid down in such a way that in the finished former 18 they run in the direction of the main axis of the latter, in which the greatest external mechanical loads also act.

Figure 3:
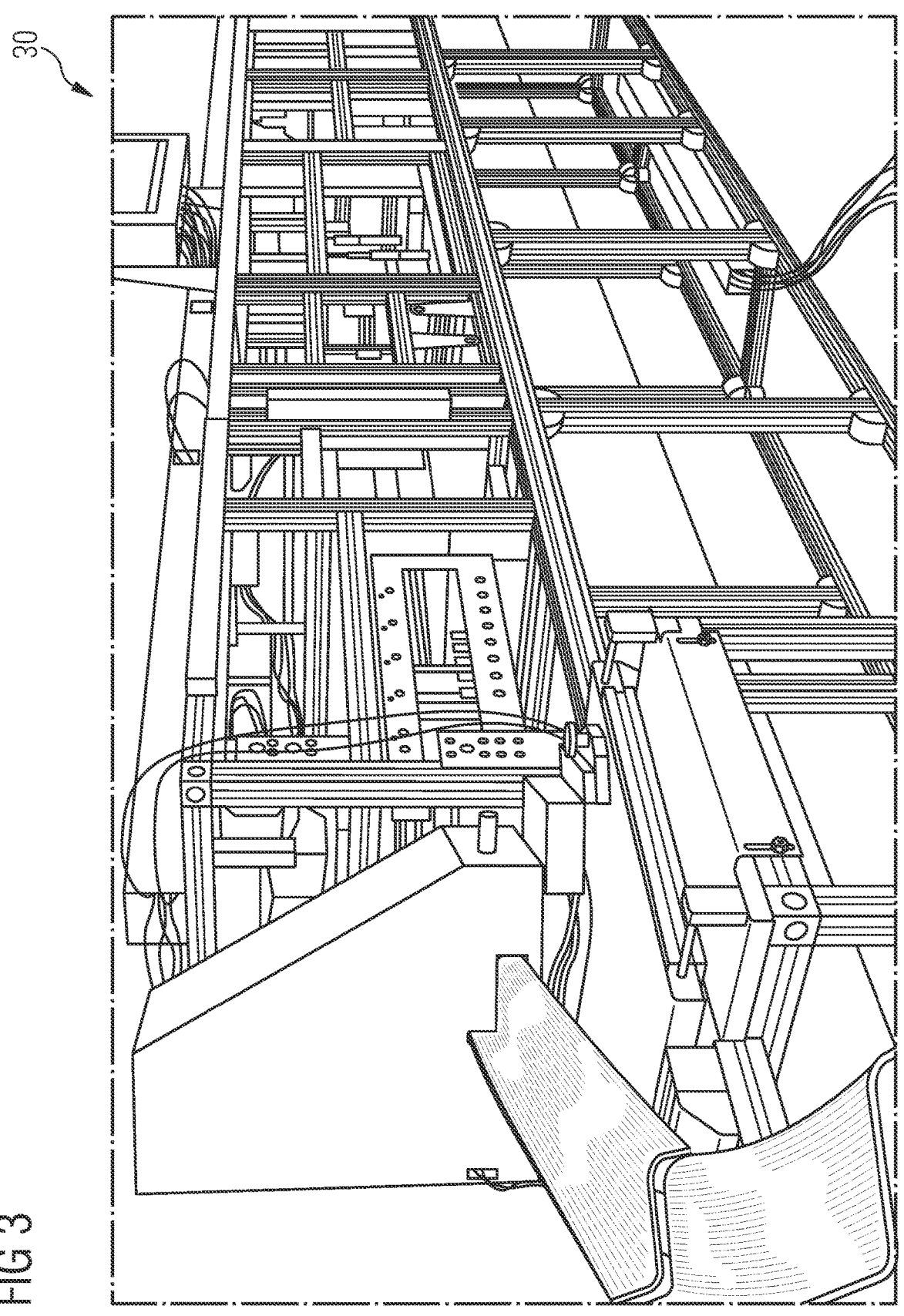
FIG. 3 a photograph and illustration of a plant for forming of a sheet-like object composed of thermoplastic fiber composite to give a semifinished part (step b))

The sheet-like object 28 is subsequently introduced into a forming apparatus 30. FIG. 3 shows a photograph of a forming apparatus 30, which is depicted here only by way of example, for continuous forming of the sheet-like object 28 (apparatus and photograph here from the company Brötje). The sheet-like object 28 is, independently of the plant depicted, formed by, for example, roll forming to give a former 18. For this purpose, the sheet-like object 28 is heated in a forming apparatus, e.g. an apparatus for roll forming, or for example even beforehand in a heating device (not shown) in a production line to a temperature which is sufficiently high for the thermoplastic fiber composite to become plastically deformable and to be able to be deformed under the action of the rollers.

When the sheet-like object 28, here by way of example a thermoplastic composite composed of polyether ether ketone and carbon fibers, is introduced into the forming apparatus for roll forming, the rollers perform, in a conventional manner, stepwise forming of the sheet-like object 28 to give a former 18. The plasticity of the sheet-like object 28 which is achieved by heating ensures not only externally visible forming but also the internal sliding of the carbon fibers in the softened matrix of polyether ether ketone into the desired fiber orientation.

In addition, the laminate of strips 20 of thermoplastic fiber composite is partially but not completely solidified or consolidated under the pressure of the rollers and at the elevated temperature of the laminate.

Finally, a semifinished part which already has, for example, a near net shape, i.e. essentially already has the shape of the component sought as end product, leaves the forming apparatus 30. However, the semifinished part can also have a shape which makes further forming in the subsequent step c) necessary.

The term semifinished part thus encompasses both a near-net-shaped component which is obtained at the end of step b) and only has to be solidified or consolidated in the subsequent step c) and also a precursor of a component or a component intermediate which leaves the forming apparatus 30 after step b) has been carried out in order then to be not only solidified or consolidated but also formed again in step c).

Figure 4:
FIG. 4 a photograph and illustration of a solidification apparatus for consolidating or solidifying the semifinished part to give a component (step c)).

The semifinished part obtained in this way, which here has, for example, essentially the shape of a still linear former 18, is subsequently introduced into a pressing apparatus 34 for solidification and here, for example, also for further forming. The semifinished part is here heated to, for example, a temperature in the range from 300 to 400° C. The pressing tools in the form of female and male dies have a curvature which corresponds to the curvature of the aircraft fuselage in the circumferential direction. The pressure exerted by the pressing tool ensures forming of the linear former 18 to give a curved former 18 having a radius of curvature which corresponds exactly to the radius of curvature of the inside of the outer skin 14 of the fuselage section 12. The pressure exerted also brings about complete consolidation or solidification of the thermoplastic fiber composite. FIG. 4 shows, merely by way of example, a commercial pressing apparatus 34 in which the solidification step c) of the process of the disclosure herein can be carried out.

The disclosure herein relates to the field of production of frame components such as formers or former-like components composed of CFP composite for an aircraft, with the components or the composite being based on a thermoplastic matrix material.

The production of such composite components for the aircraft industry is a complex operation. Components which are made of fiber-reinforced plastics have an optimized construction feature with regard to the anisotropic properties of the fiber-reinforced plastic. The components are predominantly solidified or consolidated at temperatures of from 300° C. to 400° C. (thermoplastic high-performance plastics or TP).

In the prior art, there are processes for thermoset polymers (also known as "thermosets" or TS), in which processes stacks are formed in an orienting AFP ("automated fiber placement") process. In the production of the TS material, the stack can be heated in order to assist formation. In addition, direct placement on the tool is possible. TS components are consolidated at about 180° C. At this temperature, the matrix material is cured.

A TP material requires other process since the temperatures are higher and consolidation and cooling are used instead of curing.

In the case of sheet-like stacks and previously prepared strips or patches, a fairly similar semifinished product as for TS can be produced. The possibility of producing TP stacks without heat is very limited since the matrix blocks the movement of the fibers.

There are at present no practically usable, inexpensive processes which are suitable for producing fuselage parts, e.g. formers, using a thermoplastic polymer and which allow the necessary use of a matrix composed of thermoplastic high-performance plastic and the desired orientation of the fibers.

The disclosure herein therefore seeks to provide an improved process. The process of the disclosure herein is a combination of a static sheet-like lay-up, a continuous preforming process and a static consolidation.

This combination of process steps makes it possible to profit from the advantages of each individual process sequence without the disadvantages of a complete production process chain. The CCM ("continuous compression molding") process is, for example, fairly slow because of the time required for cooling, curvature is challenging and constant, there is no variability in respect of the shape.

In addition, it is extremely difficult to achieve some fiber orientations using the processes of the prior art.

The disclosure herein proposes a process having the following process steps:

1. Production of a product in the form of a sheet-like or flat laminate by high-speed processes which give the desired fiber orientations. Examples of these are the ATL process of Boikon, the ATL process of Airborne, the pick&place process of Airborne, the Web Industry process for CCM feed material processes.

2. The second step is a continuous forming process carried out at high speed, e.g. comprising a type of roll forming, a simplified ("light") CCM process or an adaptation of the principles of a continuous preforming of dry fibers, e.g. 3D preforming. The material is shaped (in respect of cross section and curvature) under the action of pressure and heat. The fibers can slide into the required fiber orientation position. Locally necessary orientations can be realized. The complete lay-up or the complete preform is not completely solidified or consolidated; a minimum degree of deformability remains. The preform or the lay-up can be cut in its contour and in its longitudinal direction in order then to go into the next process step. This also allows 0° fibers in the two flanges and the web of the formers and former-like components.

3. The last step is a static solidification or consolidation, for example in a pressing process using a one-sided or two-sided stiff tool. The material acquires its final contour. It is possible to use tool inserts or various tools while the same preform or the same lay-up is fed to the machine. This allows production of preforms for one-piece formers having specific shapes at low repetition costs, as required for example for the bases of formers on a fuselage skin with joggles.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 Aircraft
12 Rear fuselage section

14 Outer skin
16 Stringer
18 Former
20 Strips of thermoplastic composite
22 Placement apparatus
24 Surface of the placement apparatus
26 Placement head
28 Sheet-like object
30 Apparatus for forming the sheet-like object
32 Apparatus for solidifying the semifinished part

The invention claimed is:

1. A process for producing a stiffening component for an aircraft fuselage, the process comprising steps of:
   a) forming a sheet-like object by placing strips on a surface of a placement apparatus by an automatic placement head according to a predetermined placement pattern, such that the sheet-like object comprises a thermoplastic fiber composite which comprises a thermoplastic polymer material and reinforcing fibers embedded therein, wherein:
      the sheet-like object has, when the forming is complete, a contour corresponding to an outline of the stiffening component as a result of the placing of the strips; and
      the strips are predominantly laid down during the forming such that, in the stiffening component, the strips run in a direction of a main axis of the stiffening component;
   b) after the sheet-like object has been formed, introducing the sheet-like object into a forming apparatus for roll forming, which comprises rollers that perform stepwise forming on the sheet-like object to produce a semifinished part that has a shape that is at least partially a same as a shape of the stiffening component; and
   c) after the semifinished part has been formed, placing the semifinished part within a pressing apparatus having a male die and a female die for solidification upon heating of the semifinished part, thereby producing the stiffening component;
   wherein the male die and the female die have a curvature that corresponds to a curvature of the aircraft fuselage in a circumferential direction thereof;
   wherein the semifinished product is held immobile within the pressing apparatus while the stiffening component is produced within the pressing apparatus; and
   wherein the male die and the female die are pressed together to exert a pressure on the semifinished product to ensure that the stiffening component has a radius of curvature that is a same as a radius of curvature of an inside of an outer skin of a fuselage section of the aircraft fuselage in which the stiffening component is designated for installation.

2. The process of claim 1, wherein the thermoplastic polymer material is selected from the group consisting of one or more of polyamides, aromatic polyamides, poly-m-phenyleneisophthalamide, polyesters, aromatic polyesters, polyaryls, polyphenylene sulfides, polyether sulfones and polyaryl ether ketones, heterocyclic polymers, polyimides, polybenzimidazoles, polyether imides, and mixtures produced therefrom, and/or the reinforcing fibers consist of or comprise carbon fibers.

3. The process of claim 2, wherein the polyaryl ether ketone is selected from the group consisting of one or more of poly (ether ether ketone), poly (ether ketone ketone), poly (ether ether ether ketone), poly (ether ether ketone ketone) and poly (ether ketone-ether ketone ketone).

4. The process of claim 1, wherein step a) comprises one or more than one of steps of:

producing the sheet-like object from a starting material which is selected from the group consisting of sheets, bands, tows, patches, strips and/or tapes comprising thermoplastic fiber composite;

producing the sheet-like object from a starting material which is heated to a temperature at which a plasticity of the thermoplastic polymer material allows formation of the sheet-like object;

producing the sheet-like object by placing a starting material on a surface of a placement apparatus by using a placement robot;

producing the sheet-like object by placing a starting material to form a laminate;

producing the sheet-like object by placing a starting material according to a predetermined three-dimensional placement pattern which prescribes an orientation of the reinforcing fibers and/or a position-dependent thickness of the sheet-like object;

producing the sheet-like object by placing a starting material such that all or part of the reinforcing fibers form 0° reinforcing fibers in the finished stiffening component, based on one or more main axes, main edges, longitudinal axes, longitudinal edges of the stiffening component;

producing the sheet-like object in a static process; and producing the sheet-like object by automated fiber placement and/or automated tape laying.

5. The process of claim 1, wherein step b) comprises one or more than one of steps of:

forming the sheet-like object in a continuous forming process, or in a continuous high-speed forming process;

forming the sheet-like object under pressure conditions and/or temperature conditions under which the thermoplastic polymer material or the thermoplastic fiber composite has a plasticity suitable for the forming process;

forming the sheet-like object in a continuous profiling process;

forming the sheet-like object in a roll forming process;

forming the sheet-like object in a continuous pressure molding process, or by a simplified continuous compression molding process;

forming the sheet-like object in a 3D preforming process;

forming the sheet-like object with alteration of its cross section and/or its curvature;

forming the sheet-like object with sliding of the reinforcing fibers into a desired fiber orientation position, or with setting of a required local orientation of the reinforcing fibers;

forming the sheet-like object such that all or part of the reinforcing fibers form 0° reinforcing fibers in the finished stiffening component, based on one or more main axes, main edges, longitudinal axes and/or longitudinal edges of the stiffening component;

forming the sheet-like object with partial solidification and/or consolidation of the thermoplastic fiber composite, or with retention of a minimum degree of formability of the thermoplastic fiber composite which is necessary for step c); and forming the sheet-like object in a static process, or by pressing the semifinished part in a one-sided or two-sided molding tool.

6. The process of claim 1, wherein step c) comprises one or more than one of steps of:

solidification of the semifinished part in a static process;

solidification of the semifinished part by application of pressure, or with simultaneous heating of the semifinished part;

solidification of the semifinished part in a heatable press in a static pressing process, or with simultaneous heating of the semifinished part;

solidification of the semifinished part with retention of a shape of the semifinished part obtained in step b) or with further forming of the semifinished part;

solidification of the semifinished part in a pressing process using a one-sided or two-sided stiff pressing tool;

solidification of the semifinished part in a pressing process using a one-sided or two-sided stiff pressing tool having a tool insert which has been inserted into the pressing tool and serves for additionally altering a contour of the semifinished part;

solidification of the semifinished part in a process which is a combination of pressing and embossing, pressing and forming or forming and embossing; and solidification of the semifinished part at a temperature in a range from 300° C. to 400° C. with application of pressure.

7. The process of claim 1, wherein the semifinished part produced in step b) is cut to size for shortening the semifinished part in a longitudinal direction and/or for altering a contour of the semifinished part before it is passed to step c).

8. The process of claim 1, wherein steps a) to c) are carried out continuously in a production line.

9. The process of claim 1, wherein the heated semifinished part obtained in step b) is processed further in step c) without intermediate cooling.

10. The process of claim 1, wherein the stiffening component is a fuselage stiffening part, a frame part, a frame-like part, a formers, or a stringer.

11. The process of claim 1, wherein:

in step a), producing the sheet-like object is a static process;

in step b), forming the semifinished part from the sheet-like object is a static process; and in step c), producing the stiffening component is a static process.

12. The process of claim 1, wherein the stiffening component is a stringer for stiffening the aircraft fuselage.

13. A process for producing a component for an aircraft, the process comprising steps of:

Step a):

producing a sheet-like object comprising a thermoplastic fiber composite which comprises a thermoplastic polymer material and reinforcing fibers embedded therein;

producing the sheet-like object from a starting material which is selected from the group consisting of sheets, bands, tows, patches, strips and/or tapes comprising thermoplastic fiber composite;

producing the sheet-like object from a starting material which is heated to a temperature at which a plasticity of the thermoplastic polymer material allows formation of the sheet-like object;

producing the sheet-like object by placing a starting material on a surface of a placement apparatus by using a placement robot;

producing the sheet-like object by placing a starting material to form a laminate;

producing the sheet-like object by placing a starting material according to a predetermined three-dimensional placement pattern which prescribes an orientation of the reinforcing fibers and/or a position-dependent thickness of the sheet-like object;

producing the sheet-like object by placing a starting material such that all or part of the reinforcing fibers form 0° reinforcing fibers in the finished component, based on one or more main axes, main edges, longitudinal axes, longitudinal edges of the component;

producing the sheet-like object in a static process; and producing the sheet-like object by automated fiber placement and/or automated tape laying;

Step b):

after the sheet-like object has been produced, forming a semifinished part from the sheet-like object;

forming the sheet-like object in a continuous forming process, or in a continuous high-speed forming process;

forming the sheet-like object under pressure conditions and/or temperature conditions under which the thermoplastic polymer material or the thermoplastic fiber composite has a plasticity suitable for the forming process;

forming the sheet-like object in a continuous profiling process;

forming the sheet-like object in a roll forming process;

forming the sheet-like object in a continuous pressure molding process, or by a simplified continuous compression molding process;

forming the sheet-like object in a 3D preforming process;

forming the sheet-like object with alteration of its cross section and/or its curvature;

forming the sheet-like object with sliding of the reinforcing fibers into a desired fiber orientation position, or with setting of a required local orientation of the reinforcing fibers;

forming the sheet-like object such that all or part of the reinforcing fibers form 0° reinforcing fibers in the finished component, based on one or more main axes, main edges, longitudinal axes and/or longitudinal edges of the component;

forming the sheet-like object with partial solidification and/or consolidation of the thermoplastic fiber composite, or with retention of a minimum degree of formability of the thermoplastic fiber composite which is necessary for step c); and forming the sheet-like object in a static process, or by pressing the semifinished part in a one-sided or two-sided molding tool; and Step c):

after the semifinished part has been formed, producing the component by solidifying the semifinished part;

solidification of the semifinished part in a static process;

solidification of the semifinished part by application of pressure, or with simultaneous heating of the semifinished part;

solidification of the semifinished part in a heatable press in a static pressing process, or with simultaneous heating of the semifinished part;

solidification of the semifinished part with retention of a shape of the semifinished part obtained in step b) or with further forming of the semifinished part;

solidification of the semifinished part in a pressing process using a one-sided or two-sided stiff pressing tool;

solidification of the semifinished part in a pressing process using a one-sided or two-sided stiff pressing tool having a tool insert which has been inserted into the pressing tool and serves for additionally altering a contour of the semifinished part;

solidification of the semifinished part in a process which is a combination of pressing and embossing, pressing and forming or forming and embossing; and solidification of the semifinished part at a temperature in a range from 300° C. to 400° C. with application of pressure.

\* \* \* \* \*